US009542956B1

(12) United States Patent  
Nostrant

(10) Patent No.: US 9,542,956 B1  
(45) Date of Patent: Jan. 10, 2017

(54) SYSTEMS AND METHODS FOR RESPONDING TO HUMAN SPOKEN AUDIO

(71) Applicant: Jonathon Nostrant, Los Angeles, CA (US)

(72) Inventor: Jonathon Nostrant, Los Angeles, CA (US)

(73) Assignee: Interactive Voice, Inc., San Francisco, CA (US)

( * ) Notice: Subject to any disclaimer, the term of this patent is extended or adjusted under 35 U.S.C. 154(b) by 175 days.

(21) Appl. No.: 13/734,282

(22) Filed: Jan. 4, 2013

Related U.S. Application Data

(60) Provisional application No. 61/584,752, filed on Jan. 9, 2012.

(51) Int. Cl.
*G10L 15/00* (2013.01)
*G10L 21/00* (2013.01)

(52) U.S. Cl.
CPC ...................................... *G10L 21/00* (2013.01)

(58) Field of Classification Search
USPC ....... 704/231, 235, 246, 247, 251, 252, 258, 704/260
See application file for complete search history.

(56) References Cited

U.S. PATENT DOCUMENTS

| 2002/0174177 | A1* | 11/2002 | Miesen et al. | 709/203 |
| 2007/0208556 | A1* | 9/2007 | Kwak et al. | 704/9 |
| 2008/0294490 | A1* | 11/2008 | Nuhaan et al. | 705/9 |
| 2010/0299138 | A1* | 11/2010 | Kim | 704/9 |
| 2011/0224981 | A1* | 9/2011 | Miglietta et al. | 704/235 |
| 2012/0069131 | A1* | 3/2012 | Abelow | 348/14.01 |

* cited by examiner

*Primary Examiner* — Leonard Saint Cyr
(74) *Attorney, Agent, or Firm* — Carr & Ferrell LLP

(57) ABSTRACT

Systems and methods for responding to human spoken are provided herein. Exemplary methods may include continuously listening, via an intelligent assistant device, for an initiating command. Additionally, the method may include upon receiving the initiating command, continuously listening, via the intelligent assistant device, for an audio command and transmitting the audio command from the intelligent assistant device to a command processing server. The method may also include transmitting the audio command to at least one information source, the audio command having been converted from speech-to-text, receiving at the command processing server, a response from the at least one information source, and transmitting the response from the command processing server to the intelligent assistant device.

20 Claims, 22 Drawing Sheets

SYSTEMS AND METHODS FOR RESPONDING TO HUMAN SPOKEN AUDIO

This application claims the benefit of U.S. Provisional Patent Application Ser. No. 61/584,752, filed on Jan. 9, 2012, and entitled "SYSTEMS AND METHODS FOR RESPONDING TO HUMAN SPOKEN AUDIO USING A NATURAL LANGUAGE PROCESSOR," which is hereby incorporated herein by reference in its entirety including all references cited therein.

FIELD OF THE INVENTION

The present invention relates generally to systems and methods of responding to human spoken audio, and more specifically, to systems and methods that interpret human spoken audio and then generate a response based on the interpretation of the human spoken audio.

SUMMARY OF THE PRESENT TECHNOLOGY

According to some embodiments, the present technology may be directed to methods that comprise: (a) continuously listening, via an intelligent assistant device, for an initiating command; (b) upon receiving the initiating command, continuously listening, via the intelligent assistant device, for an audio command; (c) transmitting the audio command from the intelligent assistant device to a command processing server; (d) transmitting the audio command to at least one information source, the audio command having been converted from speech-to-text; (e) determining context and intent of the converted text; (f) receiving at the command processing server, a response from the at least one information source; and (g) transmitting the response from the command processing server to the intelligent assistant device.

According to some embodiments, the present technology may be directed to a device that comprises: (a) a display screen; (b) a first microphone; (c) a speaker; (d) a processor that executes logic stored in memory to perform operations comprising: (i) continuously listening, via the first microphone, for an initiating command; (ii) upon receiving the initiating command, continuously listening, via the first microphone, for an audio command; (iii) transmitting the audio command from to a command processing server; (iv) receiving a response from the command processing server; and (v) outputting the response via any of the display screen and the speaker.

According to some embodiments, the present technology may be directed to a system that comprises: (a) an intelligent assistant device comprising a processor which executes logic to perform operations comprising: (i) continuously listening, via a microphone, for an initiating command; and (ii) upon receiving the initiating command, continuously listening, via the microphone, for an audio command; and (b) a command processing server communicatively coupled with the intelligent assistant device, the command processing server comprising a processor that executes logic to perform operations comprising: (i) receiving the audio command from the intelligent assistant device; (ii) transmitting the audio command to at least one information source, the audio command having been converted from speech-to-text; (iii) receiving at the command processing server, a response from the at least one information source; and (iv) transmitting the response from the command processing server to the intelligent assistant device.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
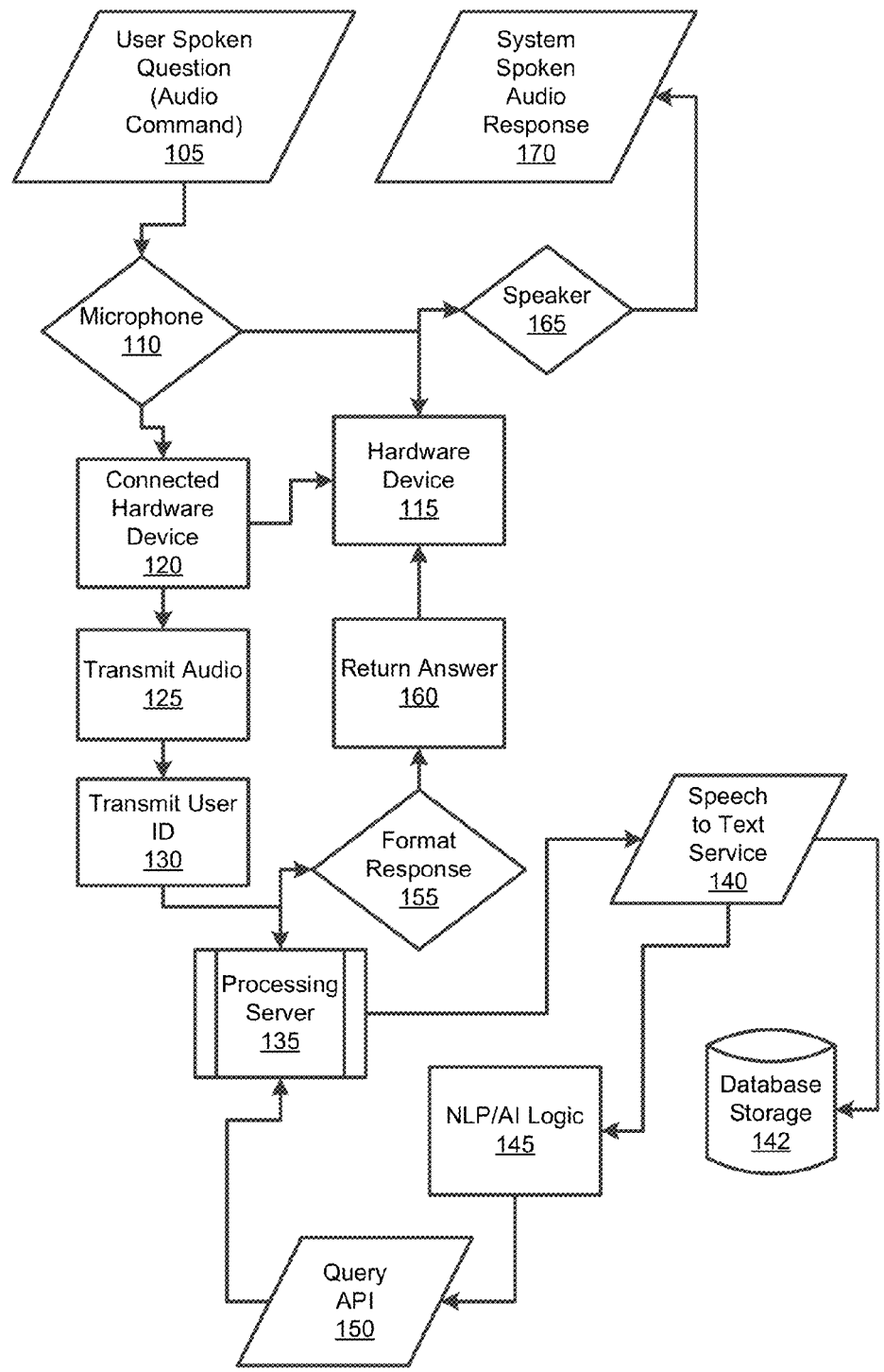
FIG. 1 is a system for processing human spoken audio, in accordance with embodiments of the present invention.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology provides hardware and software components that interact interpret and respond to human spoken audio. In some embodiments, the hardware components include a microphone that receives audio comprising human spoken audio. The audio that comprises human spoken audio may in some instances be transmitted to a cloud computing cluster (e.g., cloud-based computing environment for processing. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

With respect to the present technology, the audio commands that comprise human spoken audio may be processed to clarify the human spoken audio components from other audio aspects that may have also been recorded, such as background noise. In some instances, the present technology may utilize digital signal process beam-forming microphone assembly, which is included in an end user device. In other embodiments, various DSP processes may be utilized at the cloud level to remove background noise or other audio artifacts. The processed human spoken audio may then be transmitted to a text processor. The text processor uses speech-to-text software (such as from Nuance©) and converts the human spoken audio into a string of text that represents the human spoken audio (hereinafter, "string of text").

Once the human spoken audio has been processed into a string of text, the text processor may then return the string of text to a processing server, which then transmits the string of text to a natural language processor. The terms "natural language processor" may include, but is not limited to any system, process, or combination of systems and methods that evaluate, process, parse, convert, translate or otherwise analyze and/or transform natural language commands. For example, an exemplary natural language processor may convert natural language content from an audio-format into a text format (e.g., speech to text), and may also evaluate the content for sentiment, mood, context (e.g., domain), and so forth. Again, these natural language commands may include audio format and/or text format natural language content, as well as other content formats that would be known to one of ordinary skill in the art.

At the natural language processor, the string of text may be broken down into formal representations such as first-order logic structures that contain contextual clues or keyword targets. These contextual clues and/or keyword targets are then used by a computer system to understand and manipulate the string of text. The natural language processor may identify the most likely semantics of the string of text based on an assessment of the multiple possible semantics which could be derived from the string of text.

It will be understood that in some embodiments, one or more of the features described herein such as noise reduction, natural language processing, speech-to-text services (and vice versa), text parsing, and other features described herein may be executed at the device level (e.g., on the intelligent assistant device). In other instances, many or all of the aforementioned features may be executed at the cloud level, such that the intelligent assistant device receives audio commands and returns responses. Thus, most or all of the processing of the audio commands may occur at the cloud level. In some instances, the intelligent assistant device and the cloud may share processing duties such that the intelligent assistant device executes some of the features of the present technology and the cloud executes other processes. This cooperative content processing relationship between the intelligent assistant device and the cloud may function to load balance the duties required to process audio commands and return responses to the end user.

Based on the computer system's understanding of the semantics of the string of text, data from the string of text will be prepared for delivery to an appropriate application program interface (API). For example, a string of text comprising the query, "What's the weather look like today in Los Angeles, Calif.?" may be processed by the computer system and distributed to a weather API. Further, the weather API may process the data from the string of text to access a weather forecast for Los Angeles, Calif. associated with the day that the query was asked.

Since APIs may have different data structure requirements for processing queries, one aspect of the natural language processor may be formatting the data from the string of text to correspond to the data structure format of an API that has been determined to be appropriate.

Once an API has processed the query data derived from human spoken audio, an API response may be generated. This API response may then be converted into an appropriate pre-spoken text string, also referred to as a fulfillment. Further, the API response may be recorded in a database and then converted to a speech response. Once the API response has been converted to a speech response, the speech response may be distributed to a hardware component to playback the API speech response. The API response may also be saved and/or paired with the query data and saved in a cache for efficient lookup. That is, rather than processing the same query data multiple times, the present technology may obtain previously generated responses to identical or substantially identical query data from the cache. Temporal limitations may be placed upon the responses stored in the cache. For example, responses for queries regarding weather may be obtained from the cache only for relevant periods of time, such as an hour.

In some embodiments, a hardware unit (e.g., intelligent assistant device) may act as a base station that is connected over a Wi-Fi network to both the natural language processor as well as other enabled devices. For instance, other enabled devices may act as a microphone, transmitting human spoken audio via the base station to the natural language processor or transmitting human spoken audio directly to the intelligent assistant device and then to the natural language processor. Additionally, enabled devices may also receive commands from a general server based on interpretation of the human spoken data using the natural language processor. For instance, a Wi-Fi enabled thermostat may receive a command from the base station when the natural language processor has interpreted human spoken audio to request an increase in temperature within a room controlled by the user device that received the human spoken audio data. In some instances, the intelligent assistant device may utilize other communication media including, but not limited to, Bluetooth, near field communications, RFID, infrared, or other communicative media that would be known to one of ordinary skill in the art with the present disclosure before them.

In accordance with the discussion above, FIG. 1 is a system 100 for processing human spoken audio, in accordance with embodiments of the present invention. In particular, a user spoken question or command 105 is received at microphone 110. The user spoken question or command is within audio data. As such, the audio data comprises human spoken audio. The audio data may then be transmitted to hardware device 115 (such as an intelligent assistant device) or connected hardware device 120, such as a cellular phone or digital music player. If the audio data is transmitted to connected hardware device 120, the audio data may then be further transmitted to hardware device 115 after being received at connected hardware device 120. Alternatively, hardware device 115 may comprise microphone 110 such that hardware device 115 is able to record user commands and distribute recorded user commands to a speech and text system for initial processing.

From hardware device 115, audio 125 and user identification information 130 is transmitted to a server 135, also referred to a command processing server. The audio may be cleaned at the server 135. In particular, a combination of a microphone array (e.g., using audio captured by multiple microphones), beam-forming, noise-reduction, and/or echo cancellation system may be used to clean up the audio received to remove audio characteristics that are not human spoken audio. Once audio is received at the server 135, the audio is provided to a speech-to-text service 140.

At the speech-to-text service 140, the audio is converted to a string of text that represents human spoken audio. In embodiments, the string of text may be stored in a database 142. In particular, database 142 may be used for storage of user data and for the storage of processed queries. Further, database 142 may be used to manage learned behaviors based on unique hardware identification.

The string of text may then be transmitted to a natural language processor 145. Natural language processor 145 may parse unstructured text documents and extract key concepts such as context, category, meaning, and keywords. Additionally, the natural language processor 145 may comprise artificial intelligence (AI) logic to process the string of text into a discernible query. Further, natural language processor 145 may utilize machine learning and/or a neural network to analyze the string of text. For example, natural language processor 145 may utilize a method of interpreting and learning from patterns and behaviors of the users and attributing data to such behaviors.

Further, natural language processor 145 may be run using a server system used to run natural language processor 145 and a neural network. Additionally, the natural language processor 145 may determine which query API 150 is most appropriate to receive the query associated with the string of text. Further, once a query API 150 is determined, the natural language processor 145 may modify the query to comply with the structure of queries appropriate to the determined query API 150.

The query generated at the natural language processor 145 is then provided to a query API 150. An exemplary API may comprise a variety of open source or licensed APIs that are used to take natural language processor output and retrieve the necessary data. The query API 150 processes the query and provides a query response to server 135. Once the query response is received at server 135, the query response may be transmitted to a format response component 155. The format response component 155 may comprise, for example, a text-to-speech translator. In particular, a text-to-speech translator may comprise a system used to take the national language processor output in text format and output in spoken audio. The answer 160 may then be provided to hardware device 115, such as via a device interface comprising a process of returning the spoken audio, from the text-to-speech component to hardware device 115. From hardware device 115, the answer may be transmitted through a speaker 165 to a system spoken audio response 170.

Figure 2:
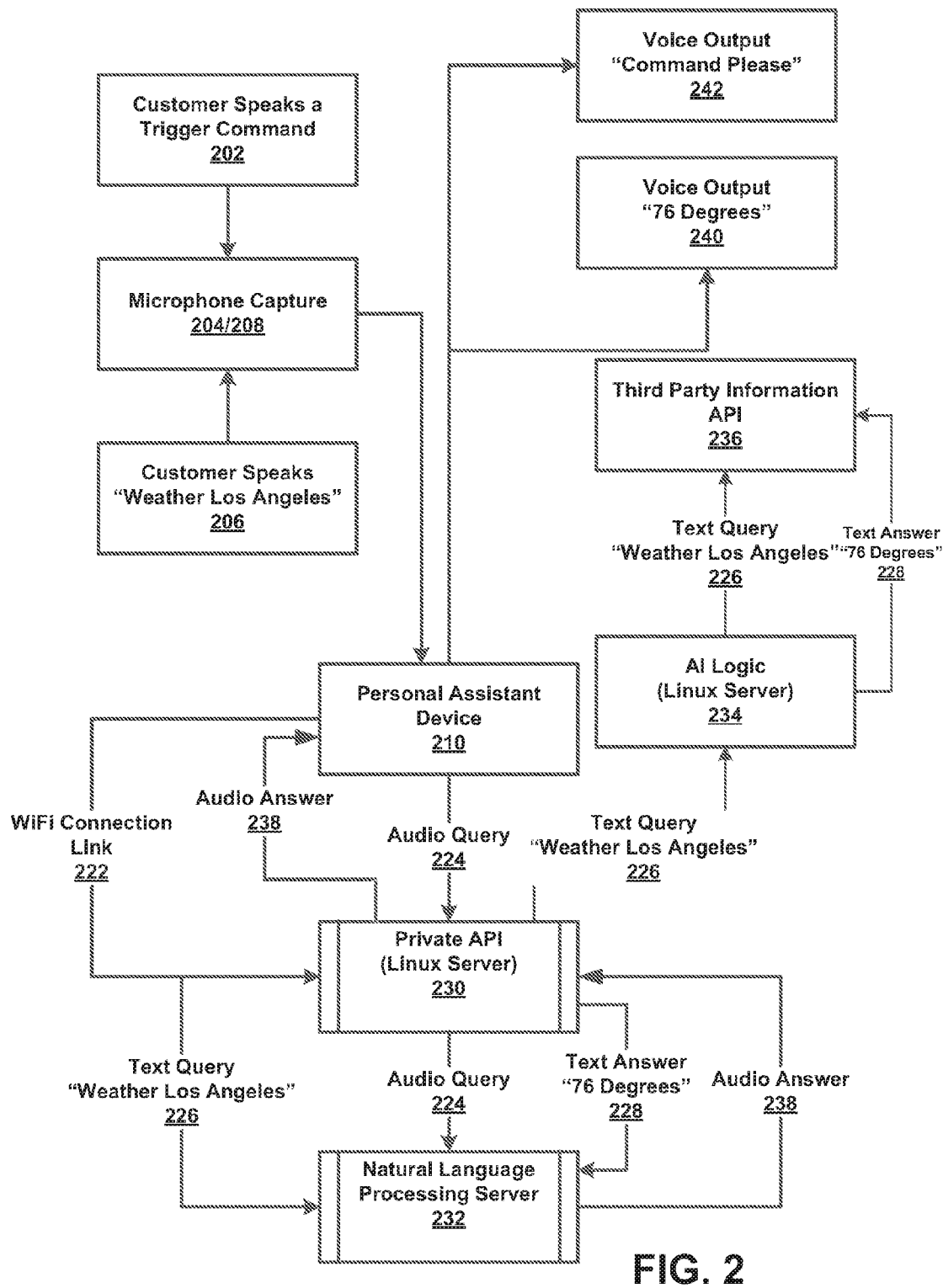
FIG. 2 illustrates a flowchart of processing human spoken audio, in accordance with embodiments of the present invention.

FIG. 2 illustrates a flowchart for processing human spoken audio, in accordance with embodiments of the present invention. At 202, a customer speaks a first trigger command, "Hello, ivee." It will be understood that the trigger command may be end user defined. At 204, a microphone captures the first trigger command, which may then be transmitted to device 210. The first trigger command may also be referred to as an initiating command. An initiating command may prompt the device to ready itself for a subsequent audio command.

In another embodiment, a customer speaks a second trigger command (also referred to as an audio command) such as, "Weather Los Angeles," at 206. In some instances, the audio command may comprise a natural language or spoken word command, such as the audio command at 206. The second trigger command is captured at 208 by a microphone and transmitted to device 210. Device 210 is coupled with a private API 230 via WiFi connection 222. Further, device 210 provides an audio query 224 to private API 230. In particular, audio query 224 is derived from an audio command.

Audio query 224 may then be provided to a speech/text processor 232, which translates the audio query 224 into text query "Weather Los Angeles" 226. Text query "Weather Los Angeles" 226 is then provided to private API 230, which directs text query "Weather Los Angeles" 226 to an AI Logic component 234. AI Logic component 234 then provides text query "Weather Los Angeles" 226 to a third party API 236. For example, for the text query "Weather Los Angeles" 226, an appropriate third party API 236 may be a weather API. Third party API 236 then generates text answer "76 Degrees" 228.

Text answer "76 Degrees" 228 may then be provided to AI Logic component 234. Further, text answer "76 Degrees" 228 may then be transmitted from AI Logic component 234 to private API 230. Further, text answer "76 Degrees" 228 is provided to a speech/text processor 232 where text answer "76 Degrees" 228 is translated to audio answer 238. Audio answer 238 may then be provided to private API 230 and then provided to device 210. From device 210, audio answer 238 is output as an audio "76 Degrees" 240. In particular, audio response "76 Degrees" 240 is in response to audio command "Weather Los Angeles" 204. Further, audio "Command Please" 242 is in response to the initiating command "Hello, ivee" 202.

Figure 3:
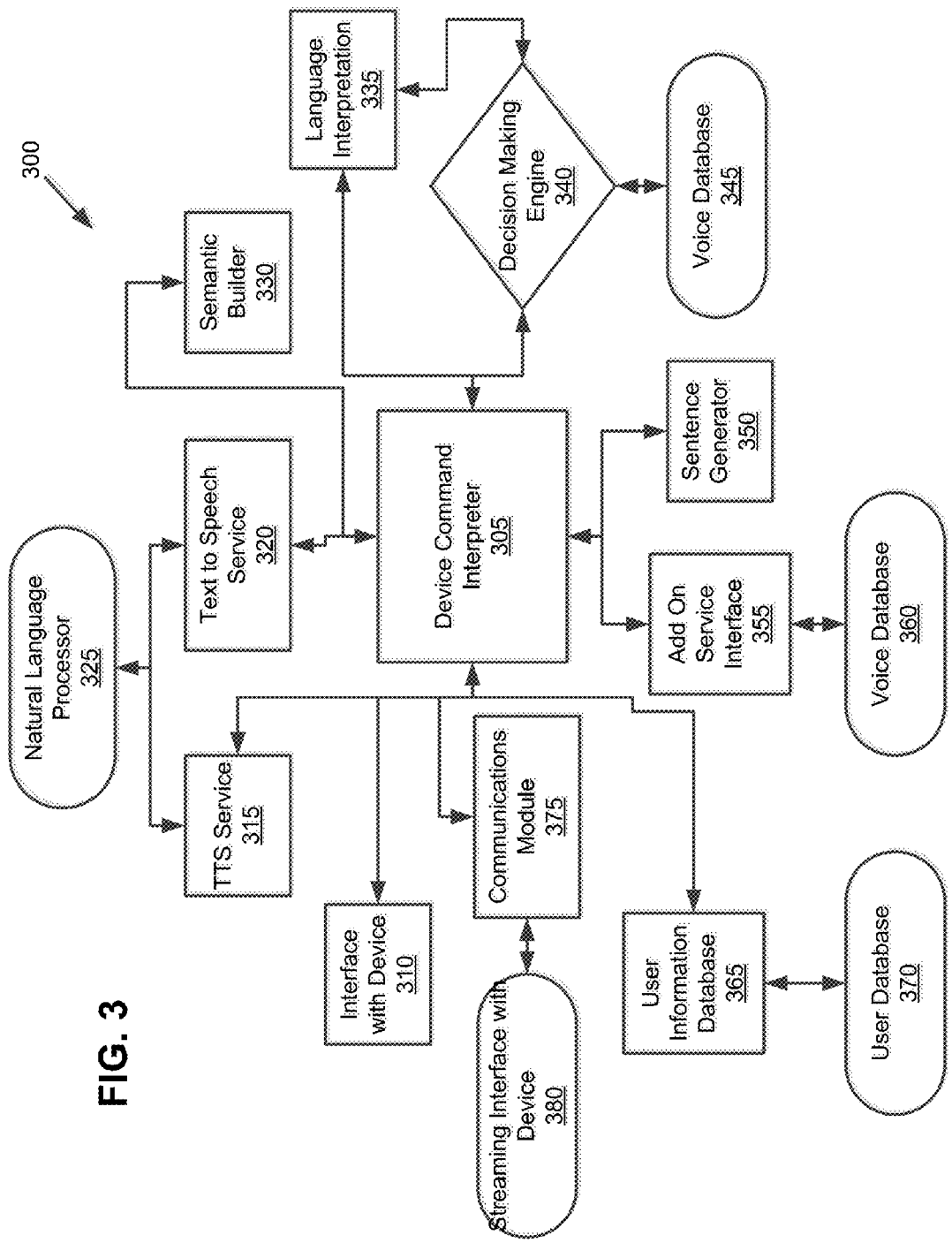
FIG. 3 illustrates a display of interactions utilizing a device command interpreter, in accordance with embodiments of the present invention.

FIG. 3 illustrates a display 300 of interactions utilizing a device command interpreter 305, in accordance with embodiments of the present invention. For example, device command interpreter 305 interacts with an interface with a device 310. In particular, device command interpreter 305 receives a command from the interface with the device. Device command interpreter 305 also provides commands to the interface with the device 310. Further, device command interpreter 305 interacts with a text/speech processor 325. In particular, device command interpreter 305 may provide a request for text-to-speech translation by providing a string of text to a text-to-string ("TTS") component 315 of the text/speech processor 325. Additionally, device command interpreter 305 may provide a request for speech-to-text translation by providing a voice file to a speech-to-text component 320 of the text/speech processor 325. Further, device command interpreter 305 may receive scenario information from scenario building component 330.

Additionally, device command interpreter 305 is also communicatively coupled with language interpreter 335. In particular, device command interpreter 305 may provide a sentence with scenario information to language interpreter 335. Further, the language interpreter 335 may generate analyzed sentence information and send the analyzed sentence information with scenario information to a decision making engine 340. The decision making engine 340 may select a most appropriate action. Further, the decision making engine 340 may utilize user accent references from a voice database 345. Based on the analyzed sentence information and the scenario information, the decision making engine 340 may generate a selected most appropriate action from scenarios and, further, may provide the selected most appropriate action to the device command interpreter 305.

The device command interpreter 305 may also send a request to build sentence information to a sentence generator component 350. In response, the sentence generator component 350 may provide a built sentence string to device command interpreter 305. Additionally, the device command interpreter 305 may request service on servers by providing a service request to an add on service interface 355. The add on service interface 355 may provide the service request to a voice database web server 360. Further, a response generated by voice database web server 360 may be provided to the device command interpreter 305 via the add on service interface 355.

Further, device command interpreter 305 may interact with a user database 370 via a user information database 365. In particular, device command interpreter 305 may provide user information and device authentication to the user database 370 via an interface of the user information database 365. Additionally, device command interpreter 305 may interact with a streaming interface 380 of a device via communications module 375. In particular, device command interpreter 305 may provide a file for download and/or text-to-speech voice data to file downloader. Communications module 375 may include any data communications module that is capable of providing control of data streaming processes to the streaming interface 380 of the device. In response, the streaming interface 380 of the device may provide a data stream to communications module 375. The communications module 375 may provide a voice streaming up of device command interpreter 305.

Figure 4:
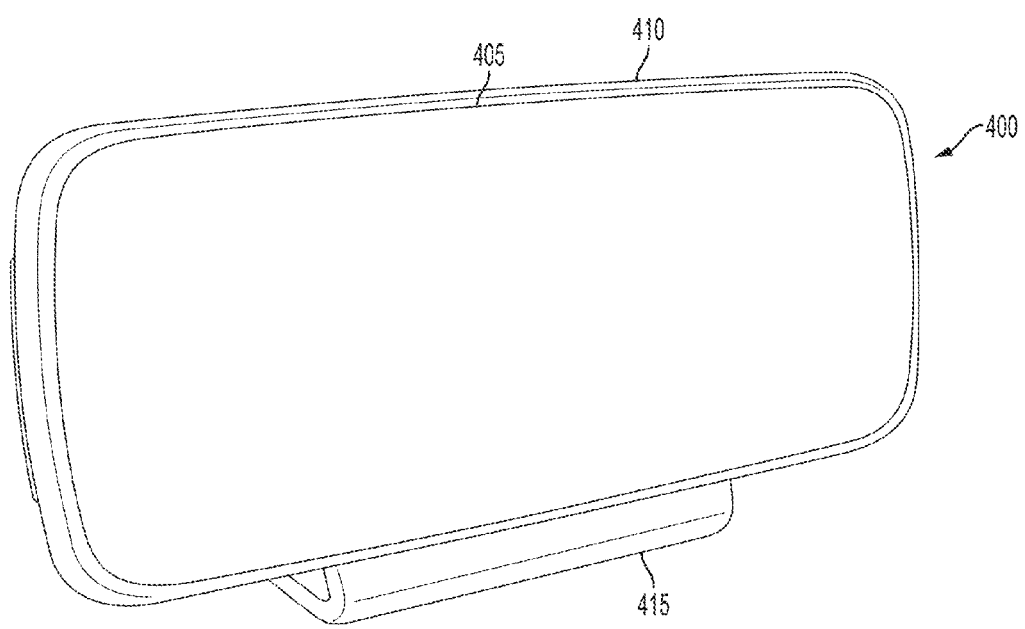
FIG. 4 illustrates a front perspective view of an intelligent assistant device, in accordance with embodiments of the present invention.
Figure 5:
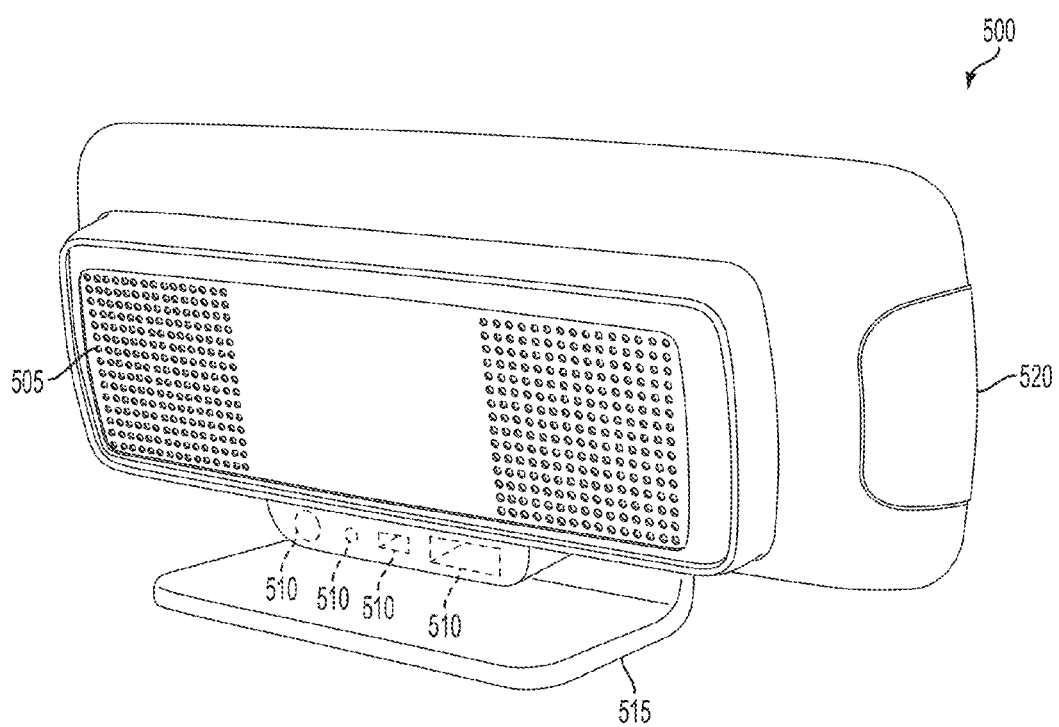
FIG. 5 illustrates a rear perspective view of an intelligent assistant device, in accordance with embodiments of the present invention.

FIG. 4 illustrates a front perspective view 400 of an intelligent assistant device, in accordance with embodiments of the present invention. In particular, intelligent assistant device comprises a screen 405, a frame 410, and a device stand 415. Further, FIG. 5 illustrates a rear perspective view 500 of an intelligent assistant device, in accordance with embodiments of the present invention. In particular, intelligent assistant device comprises a speaker 505, input slots 510, device stand 515, and button 520.

Figure 6:
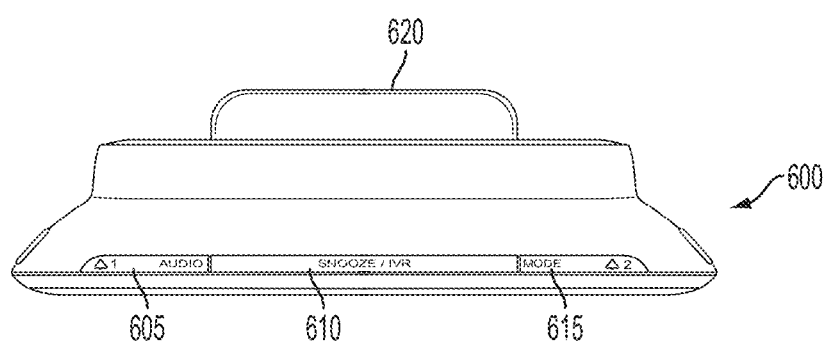
FIG. 6 illustrates an overhead view of an intelligent assistant device, in accordance with embodiments of the present invention.
Figure 7:
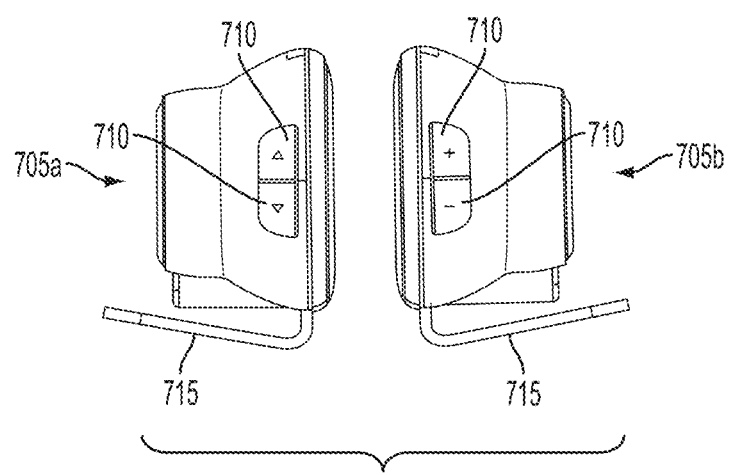
FIG. 7 illustrates side views of an intelligent assistant device, in accordance with embodiments of the present invention.

FIG. 6 illustrates an overhead view 600 of an intelligent assistant device, in accordance with embodiments of the present invention. In particular, the intelligent assistant device comprises an audio button 605, a snooze button 610, a mode button 615, and an intelligent assistant device stand 620. FIG. 7 illustrates side views 705a and 705b of an intelligent assistant device, in accordance with embodiments of the present invention. In particular, the intelligent assistant device comprises buttons 710 and intelligent assistant device stand 715.

Figure 8:
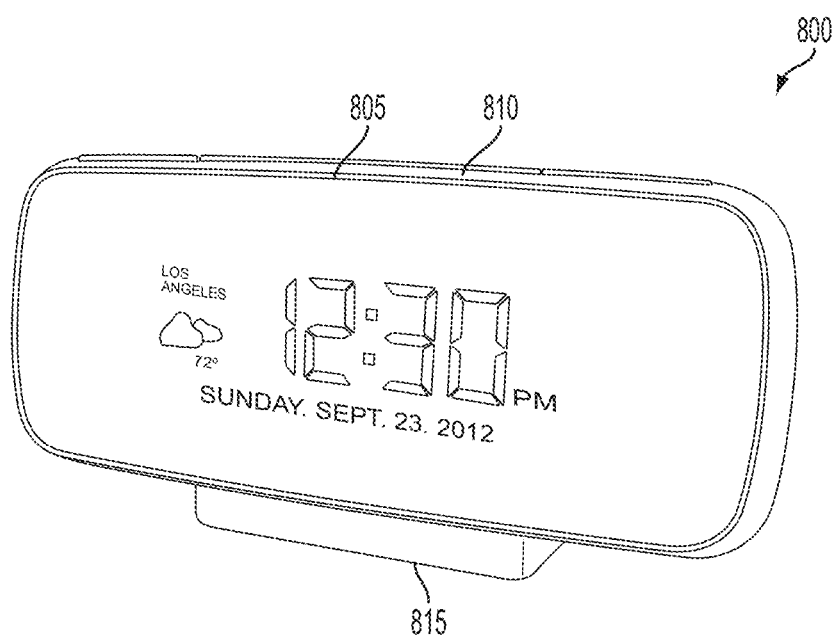
FIG. 8 illustrates another front perspective view of an intelligent assistant device, in accordance with embodiments of the present invention.

FIG. 8 illustrates another front perspective view 800 of an intelligent assistant device, in accordance with embodiments of the present invention. In particular, the intelligent assistant device comprises a screen 805, a frame 810, and a device stand 815. Further, screen 805 comprises a city indicator; a weather indicator; a date indicator; a time indicator; an alarm indicator; a message indicator; and a battery indicator. It will be understood that the screens are merely exemplary and other indicators may also likewise be utilized in accordance with the present technology. In some instances, the indicators utilized in screen 805 may relate to the types or domains of natural language queries that may be processed by the device.

Figure 9:
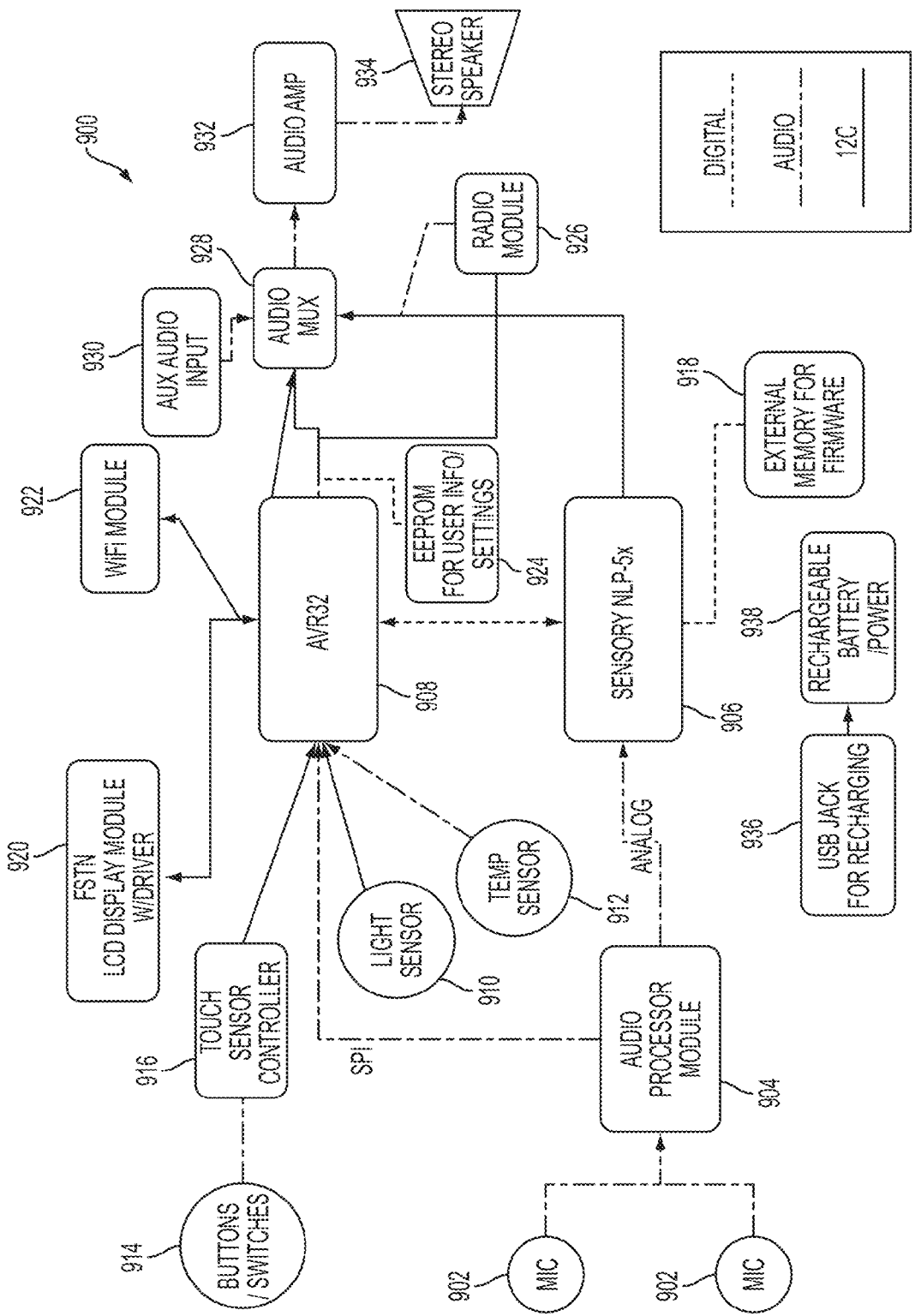
FIG. 9 provides a block diagram of components of an intelligent assistant device, in accordance with embodiments of the present invention.

FIG. 9 provides a block diagram 900 of components of an intelligent assistant device, in accordance with embodiments of the present invention. In particular, FIG. 9 comprises microphones 902 which provide audio data to an audio processor module 904. Audio processor module 904 provides analog data to a sensory natural language processor 906. Further, audio processor module 904 provides an analog or SPI (Serial Peripheral Interface) signal to a processor 908, where processor comprises a main Atmel chip. Further, light sensor 910 and temperature sensor 912 also provide data to processor 908. Buttons and/or switches 914 also provide data to processor 908 via a touch sensor controller 916. Additionally, data processor 908 is communicated between processor 908 and sensory natural language processor 906. Sensory natural language processor 906 is also coupled with an external memory for firmware 918.

Processor 908 also exchanges information with a Fast Super-Twisted Nematic Display (FSTN) Liquid Crystal Display (LCD) display module with driver 920, as well as a WiFi module 922. Further, processor 908 is communicatively coupled with an Erasable Programmable Read-Only Memory (EEPROM) 924 for user information and/or settings. Processor 908 is also communicatively coupled with radio module 926 and audio mux 928. Audio mux 928 is an audio amplifier chip. Audio mux 928 also receives data from aux audio input 930. Further, sensory natural language processor 906 also provides data to audio mux 928. Additionally, audio mux 928 provides data to audio amp 932 and stereo speaker 934. FIG. 9 also comprises, for example, a USB Jack (or other similar communicative interface) for recharging 936 that provides rechargeable battery 938.

In addition to the embodiments described above, another exemplary embodiment may utilize a plurality of microphones of a smartphone base to implement a natural language processor, in accordance with embodiments of the present invention. In particular, audio is received at the plurality of microphones at a smartphone base. The audio is received at an application running a natural language processor, such as natural language processor 145. Further, the application comprises a clean-up component that utilizes a combination of a microphone array, beam-forming, noise-reduction, and/or echo cancellation system to clean up the audio received. In particular, the clean-up component may remove non-human spoken audio and/or may remove garbled human spoken audio (e.g., background conversations) that do not comprise primary human spoken audio (e.g., the human spoken audio of the primary user). By using this process, a user can interact with a smartphone application from approximately ten feet away and closer. As such, by using audio clean-up processes such as beamforming, audio received from microphones of auxiliary hardware devices, such as a dock for smartphone devices, may be used to interact with an application that comprises a natural language processor, such as natural language processor 145.

Figure 10:
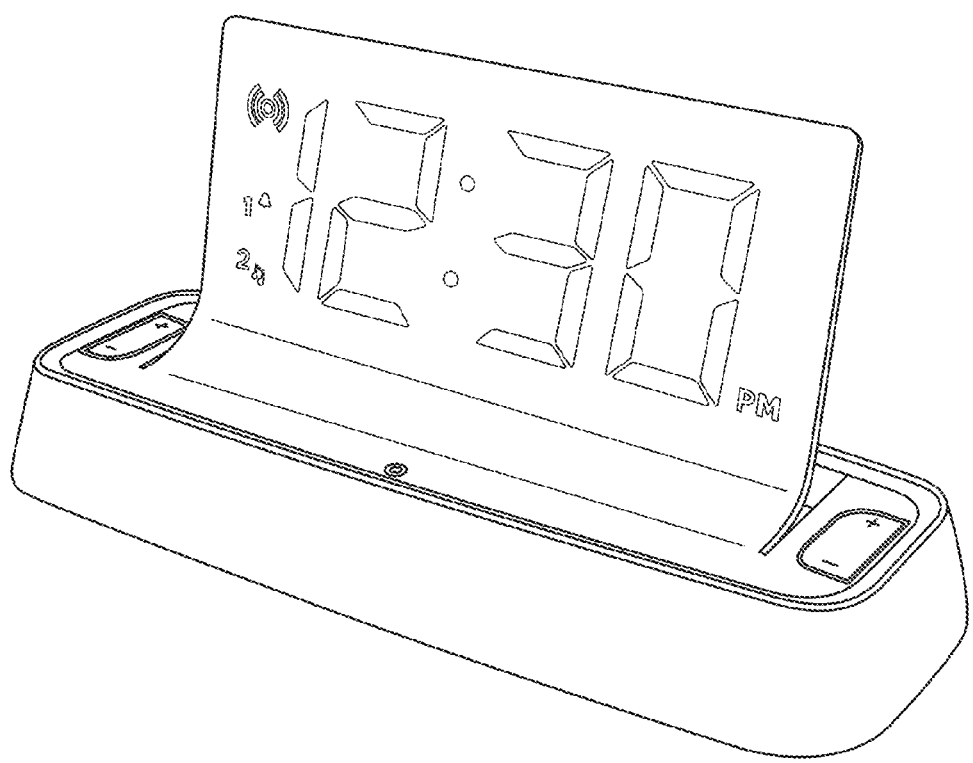
FIG. 10 is a perspective view of an exemplary intelligent assistant device.
Figure 11:
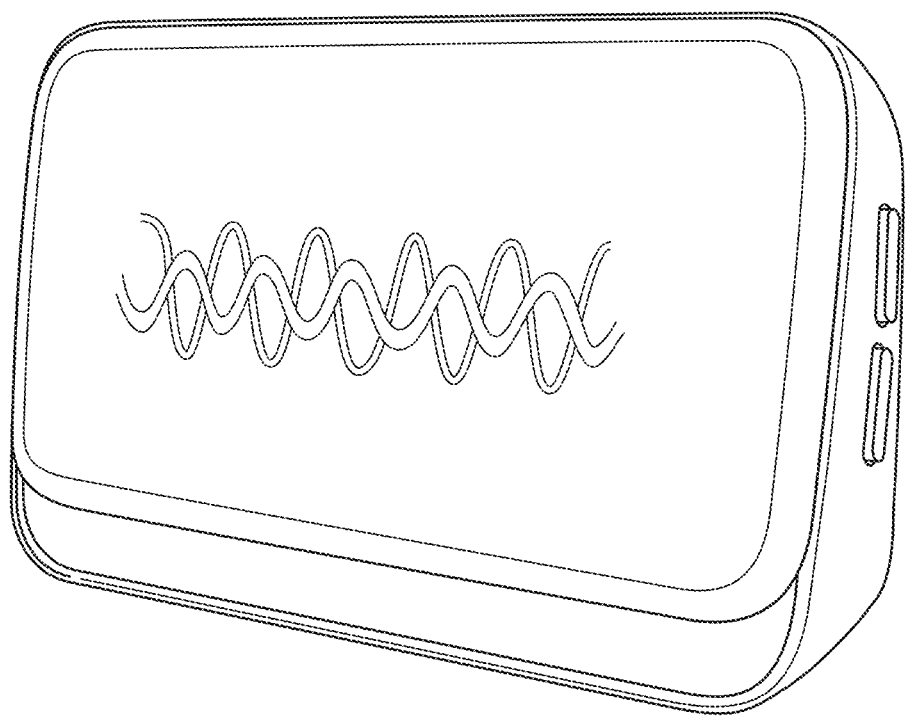
FIG. 11 is a perspective view of another exemplary intelligent assistant device.

FIG. 10 is a perspective view of an exemplary intelligent assistant device, which includes a base station in combination with a clock. The intelligent assistant device may include any of the natural language processing and third party information features described above in addition to features commonly utilized with alarm clocks. Thus, the alarm clock may be controlled by the features and operations of the personal digital assistant device associated therewith. FIG. 11 is a perspective view of another exemplary intelligent assistant device, which includes a sleek and uni-body construction.

Figure 11A:
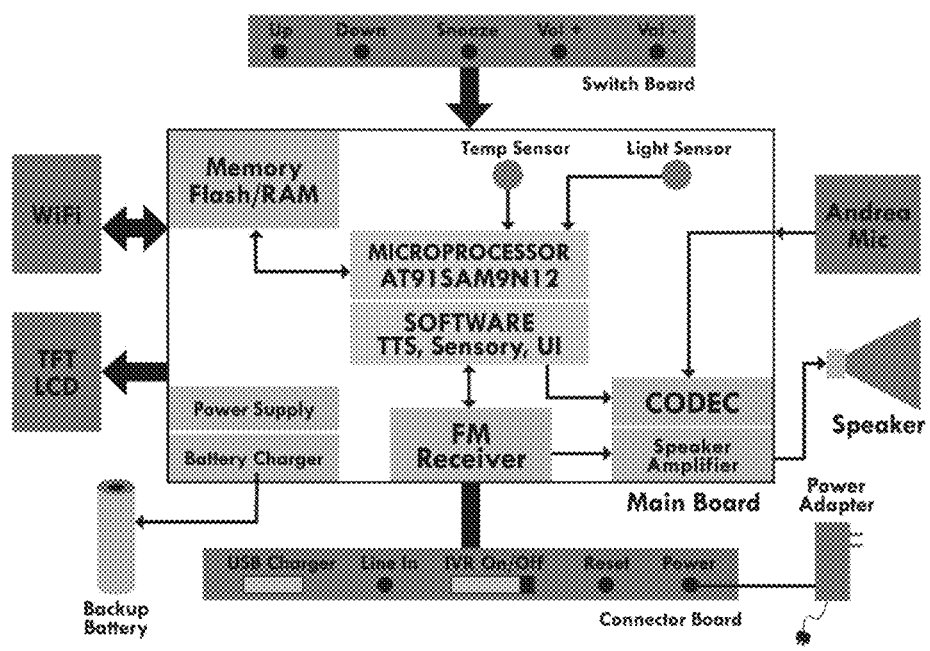
FIG. 11A is a schematic diagram of an intelligent assistant device.

FIG. 11A is a schematic diagram of various components of an intelligent assistant device, for use with any of the intelligent assistant device products described herein.

Figure 12A:
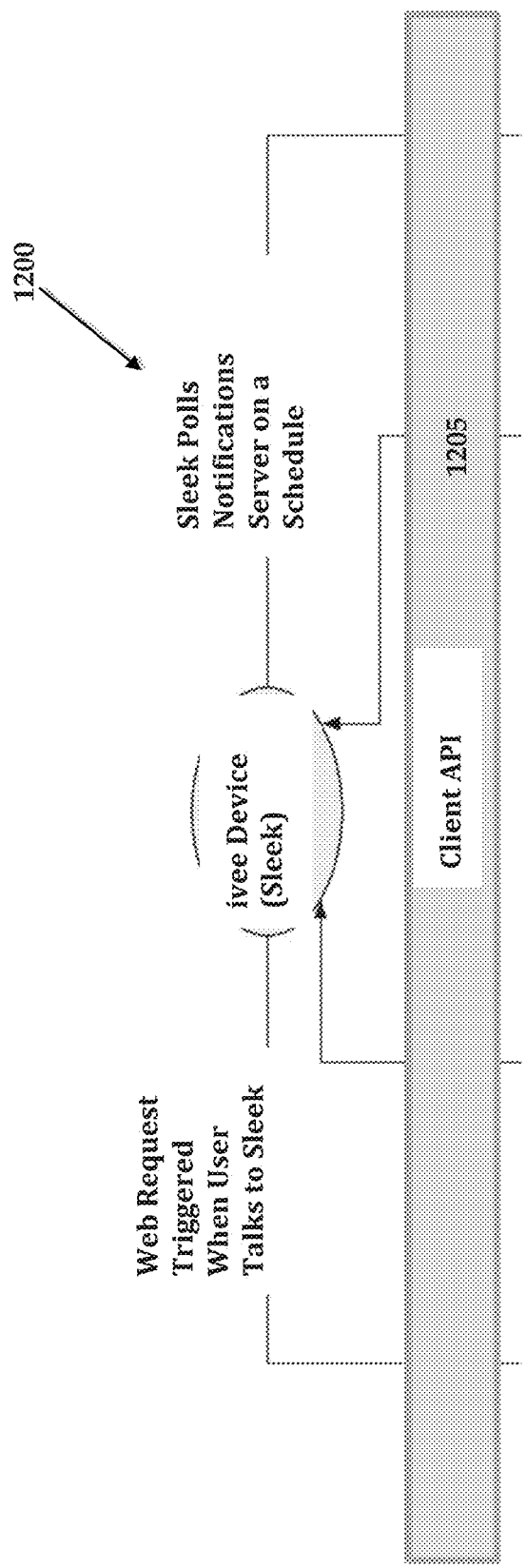
FIGS. 12A-G collectively illustrate a flow of data through an exemplary system architecture.
Figure 12B:
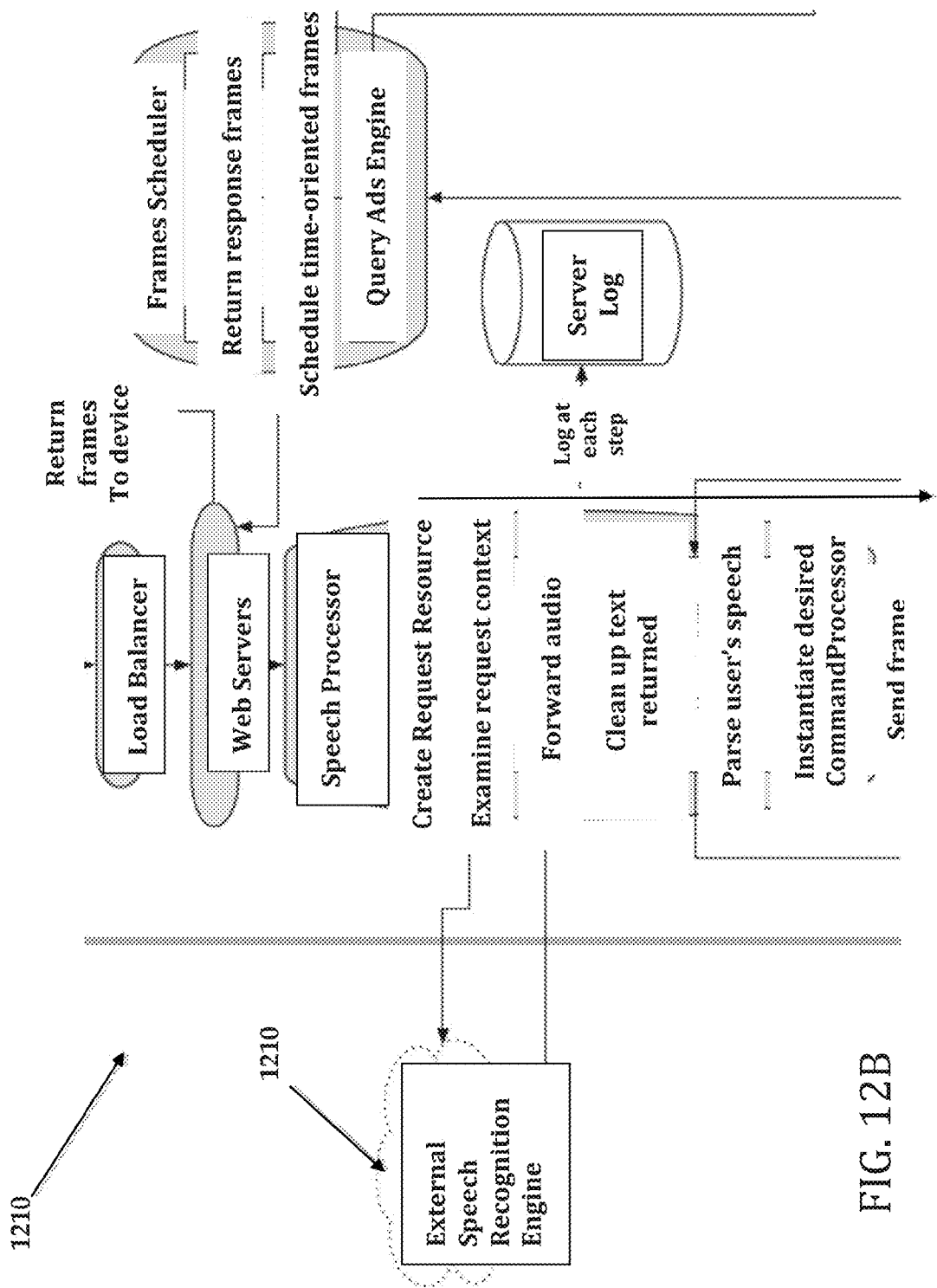

FIGS. 12A-G collectively illustrate an exemplary flow diagram of data through an exemplary system that includes an intelligent assistant device 1200. In FIG. 12A, an intelligent assistant device 1200 may be communicatively coupled with various systems through a client API 1205. More specifically, the intelligent assistant device 1200 may communicatively couple with a speech processor 1210 of FIG. 12B, which in turn, couples with an external speech recognition engine 1215, in some instances. Again, the intelligent assistant device 1200 may include an integral speech recognition application.

A frames scheduler may be utilized to schedule and correlate responses with other objects such as advertisements.

Figure 12C:
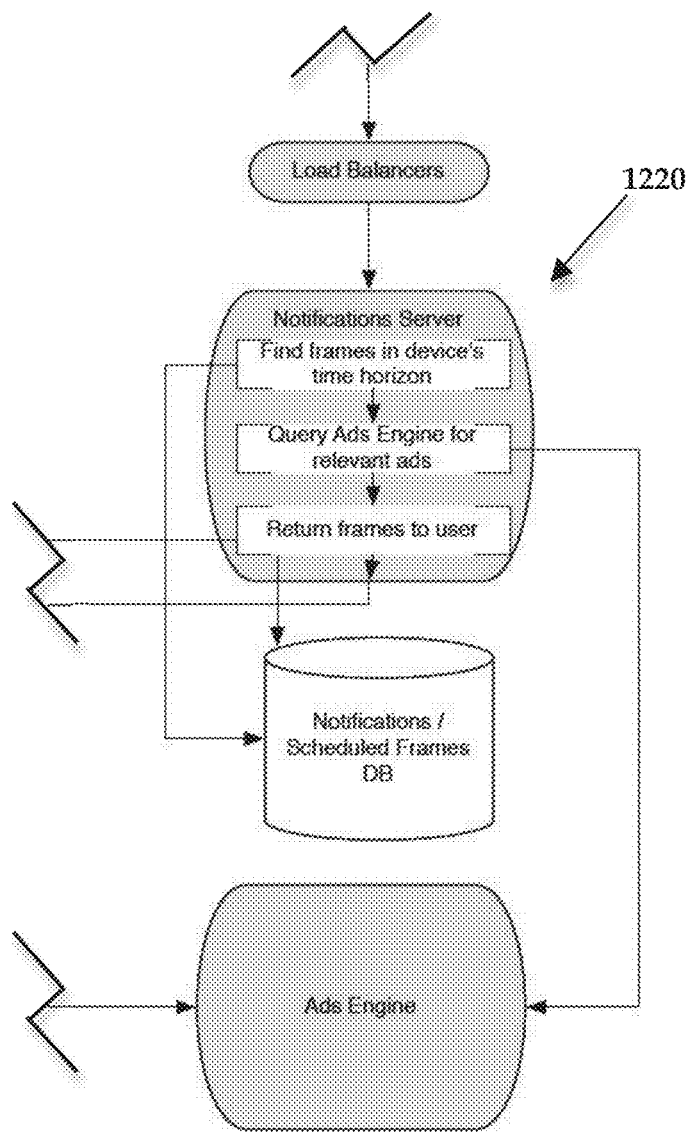

The intelligent assistant device 1200 may also communicatively couple with a notifications server 1220 as shown in FIG. 12C. The notifications server 1220 may cooperate with the frames scheduler and an advertisements engine to query relevant advertisements and integrate the same into a response, which is returned to the intelligent assistant device 1200.

Figure 12D:
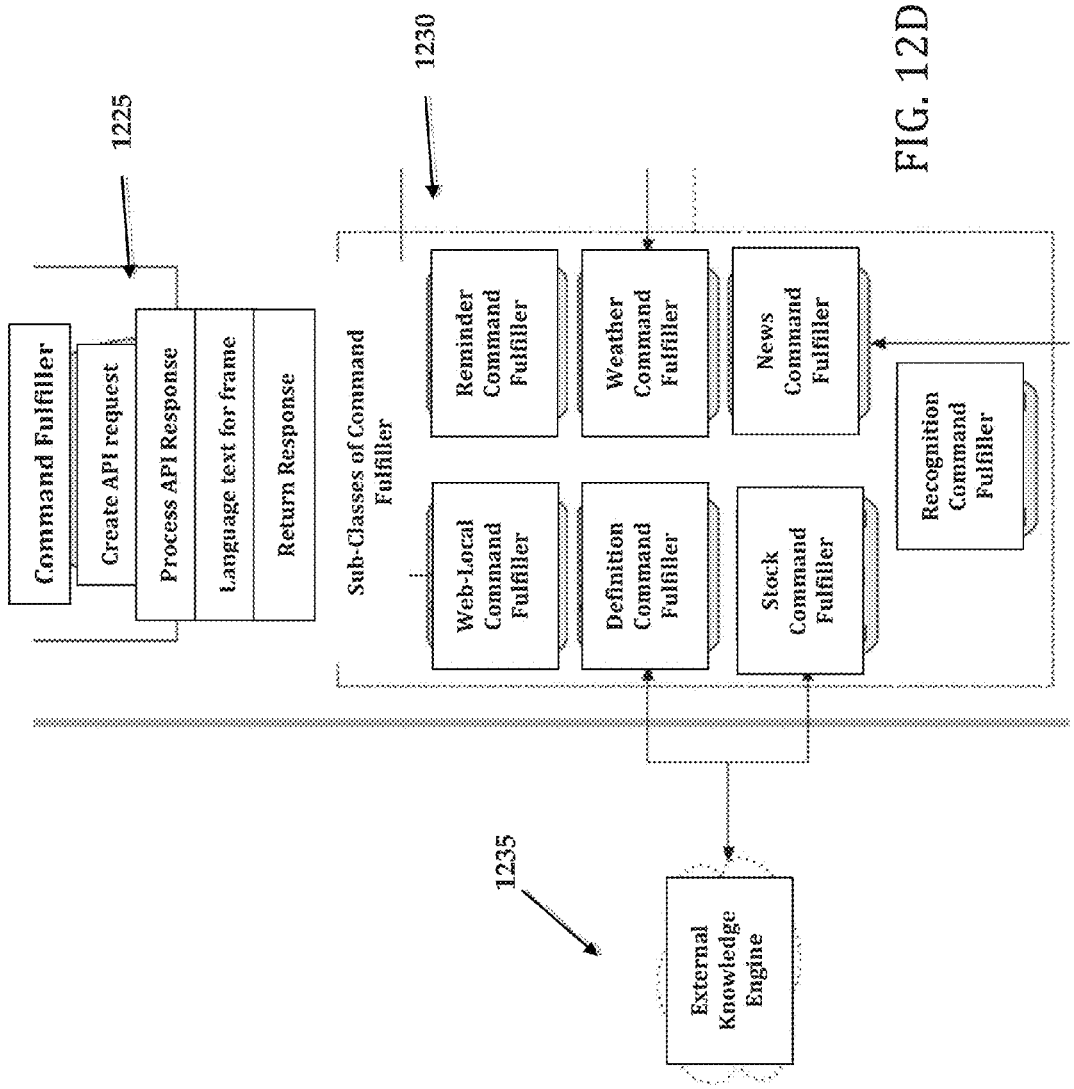

As shown in FIG. 12D, the system may utilize a command fulfiller 1225 that creates API requests and processes responses to those requests. Additionally, the command fulfiller 1225 may also generate return response objects. The command fulfiller 1225 may communicatively couple with the speech processor 1210 of FIG. 12B, as well as various sub-classes of command fulfillers 1230. These sub-classes of command fulfillers 1230 may query third party information sources, such as an external knowledge engine 1235. The sub-classes of command fulfillers 1230 may be domain specific, such as news, weather, and so forth.

Figure 12E:
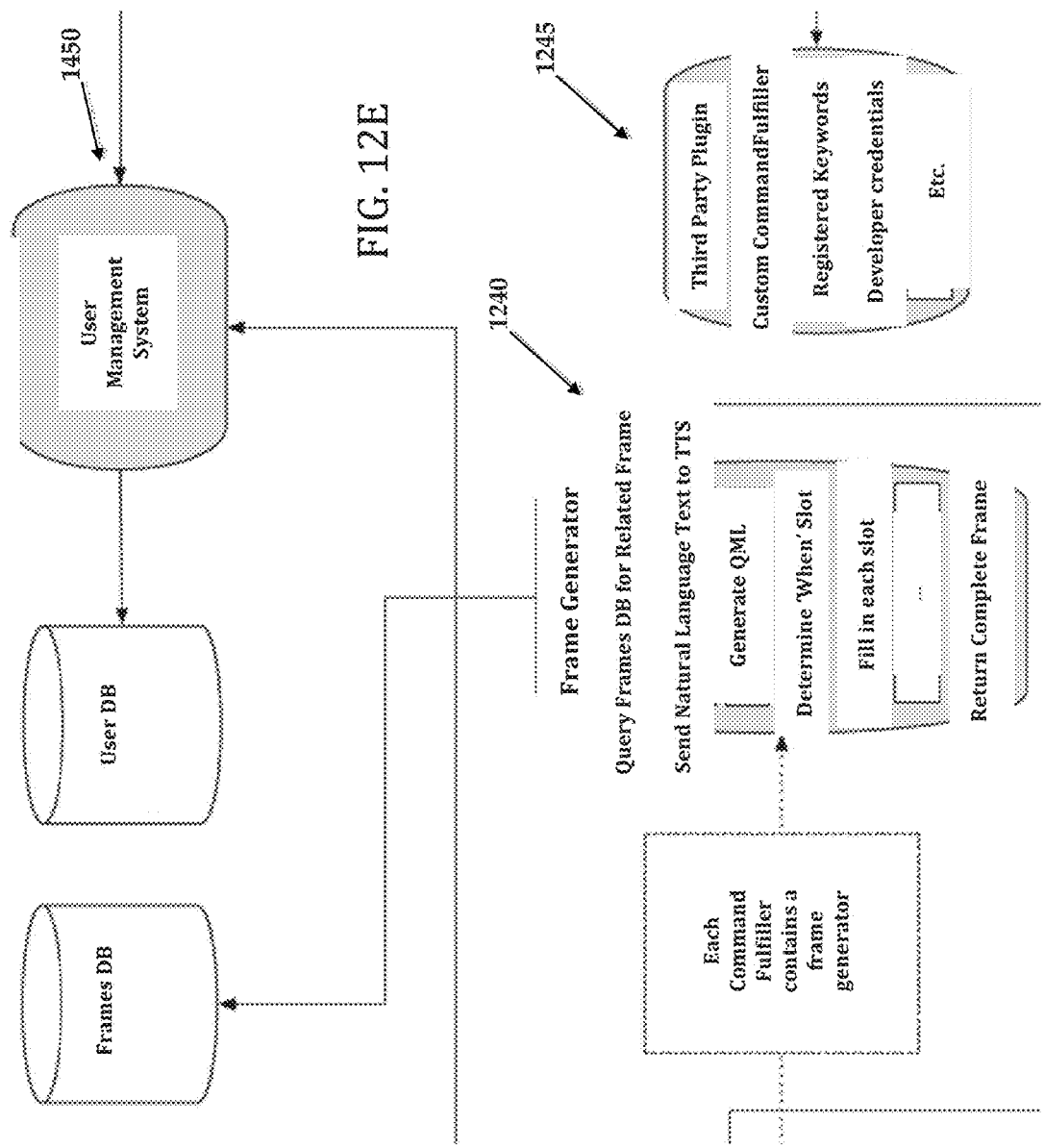
Figure 12F:
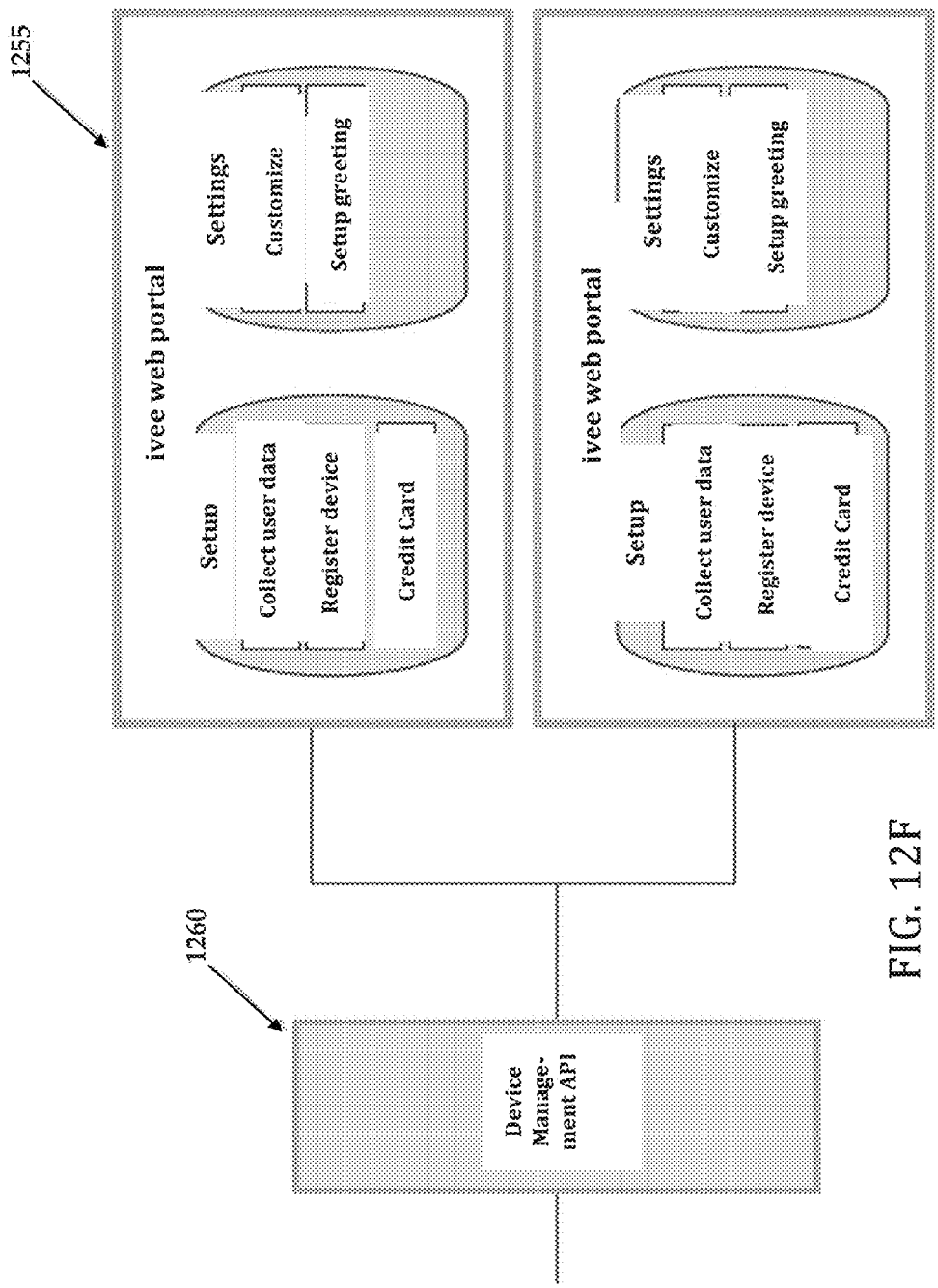
Figure 12G:
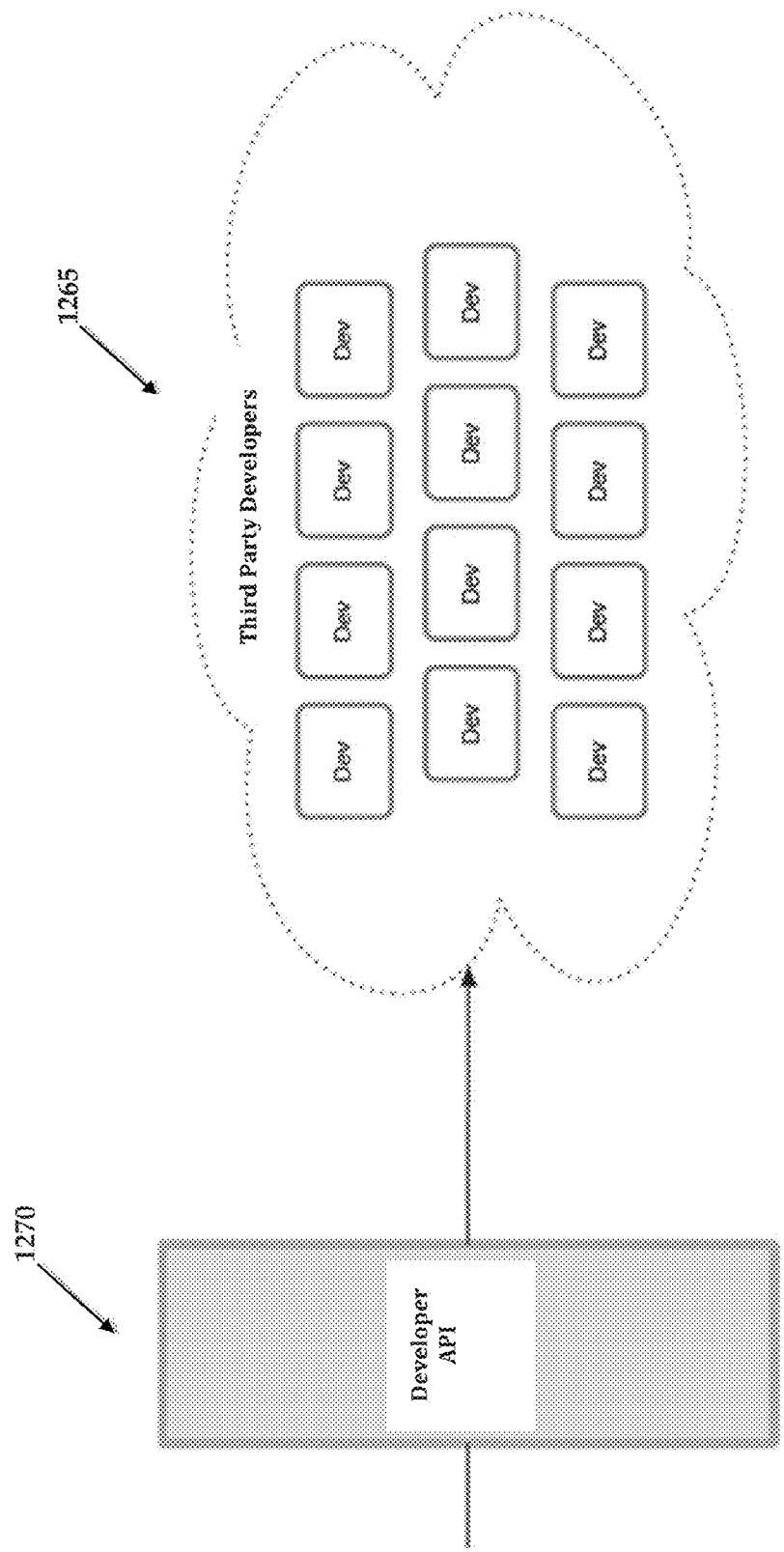

FIG. 12E illustrates the use of a frame generator 1240 that processes information obtained by the sub-classes of command fulfillers 1230 of FIG. 12D. Additionally, a plug-in framework for third party applications module 1245 is shown. This module 1245 allows for communicative coupling and interfacing of third party applications 1265 of FIG. 12G, via a developer API 1270.

Additionally, a user management system 1250 may allow for end user setup of the intelligent assistant device 1200 via an end user. The end user may utilize a web-based portal 1255 that allow for the end user to setup and manage their device via a device management API 1260.

Figure 13:
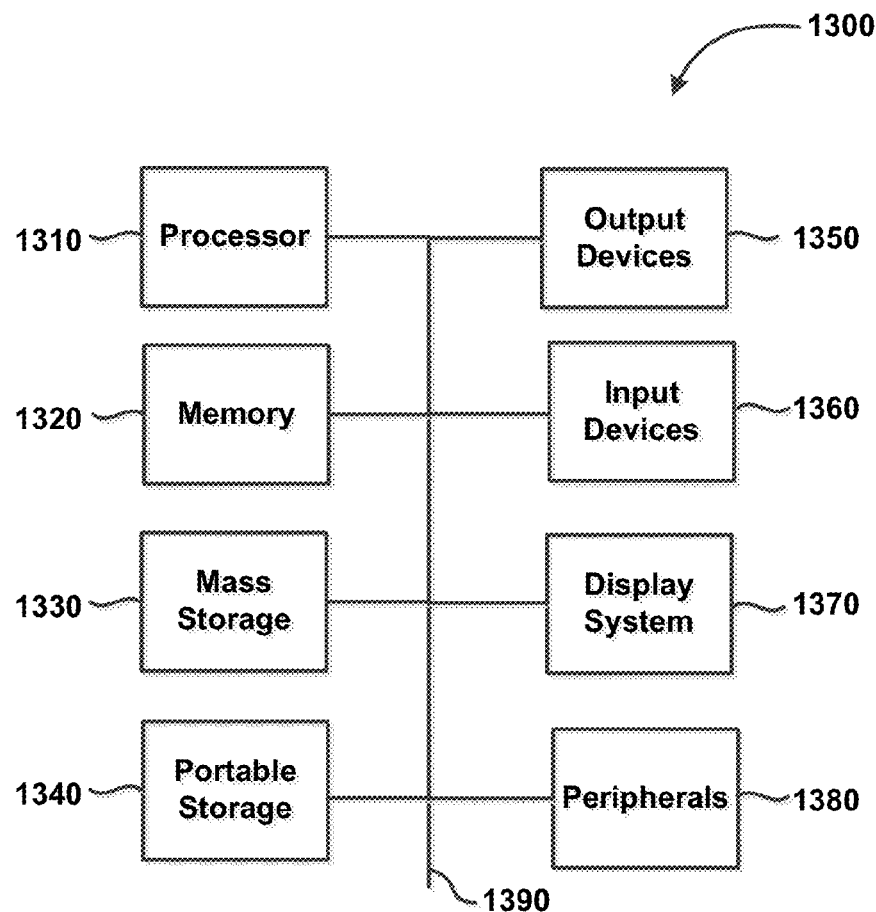
FIG. 13 illustrates an exemplary computing system that may be used to implement embodiments according to the present technology.

FIG. 13 illustrates an exemplary computing system 1300 that may be used to implement an embodiment of the present systems and methods. The system 1300 of FIG. 13 may be implemented in the contexts of the likes of computing systems, networks, servers, or combinations thereof. The computing system 1300 of FIG. 13 includes one or more processors 1310 and main memory 1320. Main memory 1320 stores, in part, instructions and data for execution by processor 1310. Main memory 1320 may store the executable code when in operation. The system 1300 of FIG. 13 further includes a mass storage device 1330, portable storage device 1340, output devices 1350, user input devices 1360, a display system 1370, and peripheral devices 1380.

The components shown in FIG. 13 are depicted as being connected via a single bus 1390. The components may be connected through one or more data transport means. Processor unit 1310 and main memory 1320 may be connected via a local microprocessor bus, and the mass storage device 1330, peripheral device(s) 1380, portable storage device 1340, and display system 1370 may be connected via one or more input/output (I/O) buses.

Mass storage device 1330, which may be implemented with a magnetic disk drive or an optical disk drive, is a non-volatile storage device for storing data and instructions for use by processor unit 1310. Mass storage device 1330 may store the system software for implementing embodiments of the present invention for purposes of loading that software into main memory 1320.

Portable storage device 1340 operates in conjunction with a portable nonvolatile storage medium, such as a floppy disk, compact disk, digital video disc, or USB storage device, to input and output data and code to and from the computing system 1300 of FIG. 13. The system software for implementing embodiments of the present invention may be stored on such a portable medium and input to the computing system 1300 via the portable storage device 1340.

User input devices 1360 provide a portion of a user interface. User input devices 1360 may include an alphanumeric keypad, such as a keyboard, for inputting alpha-numeric and other information, or a pointing device, such as a mouse, a trackball, stylus, or cursor direction keys. Additional user input devices 1360 may comprise, but are not limited to, devices such as speech recognition systems, facial recognition systems, motion-based input systems, gesture-based systems, and so forth. For example, user input devices 1360 may include a touchscreen. Additionally, the system 1300 as shown in FIG. 13 includes output devices 1350. Suitable output devices include speakers, printers, network interfaces, and monitors.

Display system 1370 may include a liquid crystal display (LCD) or other suitable display device. Display system 1370 receives textual and graphical information, and processes the information for output to the display device.

Peripherals device(s) 1380 may include any type of computer support device to add additional functionality to the computer system. Peripheral device(s) 1380 may include a modem or a router.

The components provided in the computing system 1300 of FIG. 13 are those typically found in computer systems that may be suitable for use with embodiments of the present invention and are intended to represent a broad category of such computer components that are well known in the art.

Thus, the computing system 1300 of FIG. 13 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

Figure 14A:
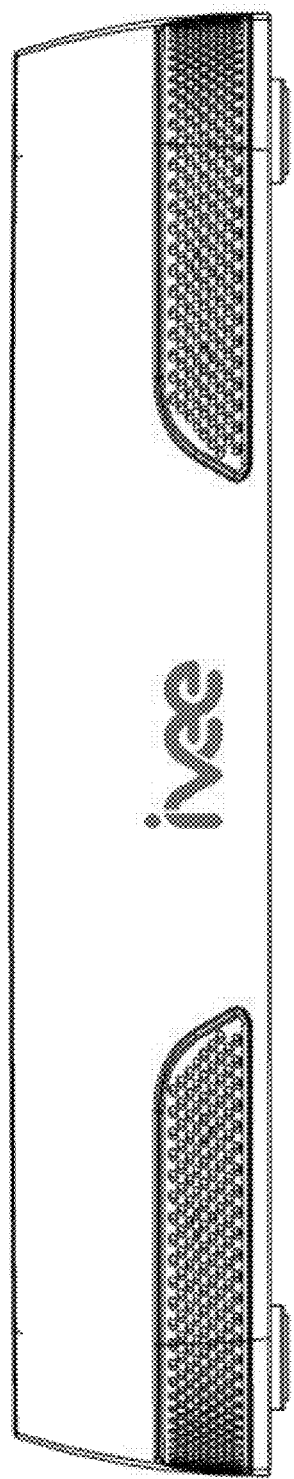
FIGS. 14A and 14B collectively include various views of another exemplary intelligent assistant device.
Figure 14B:
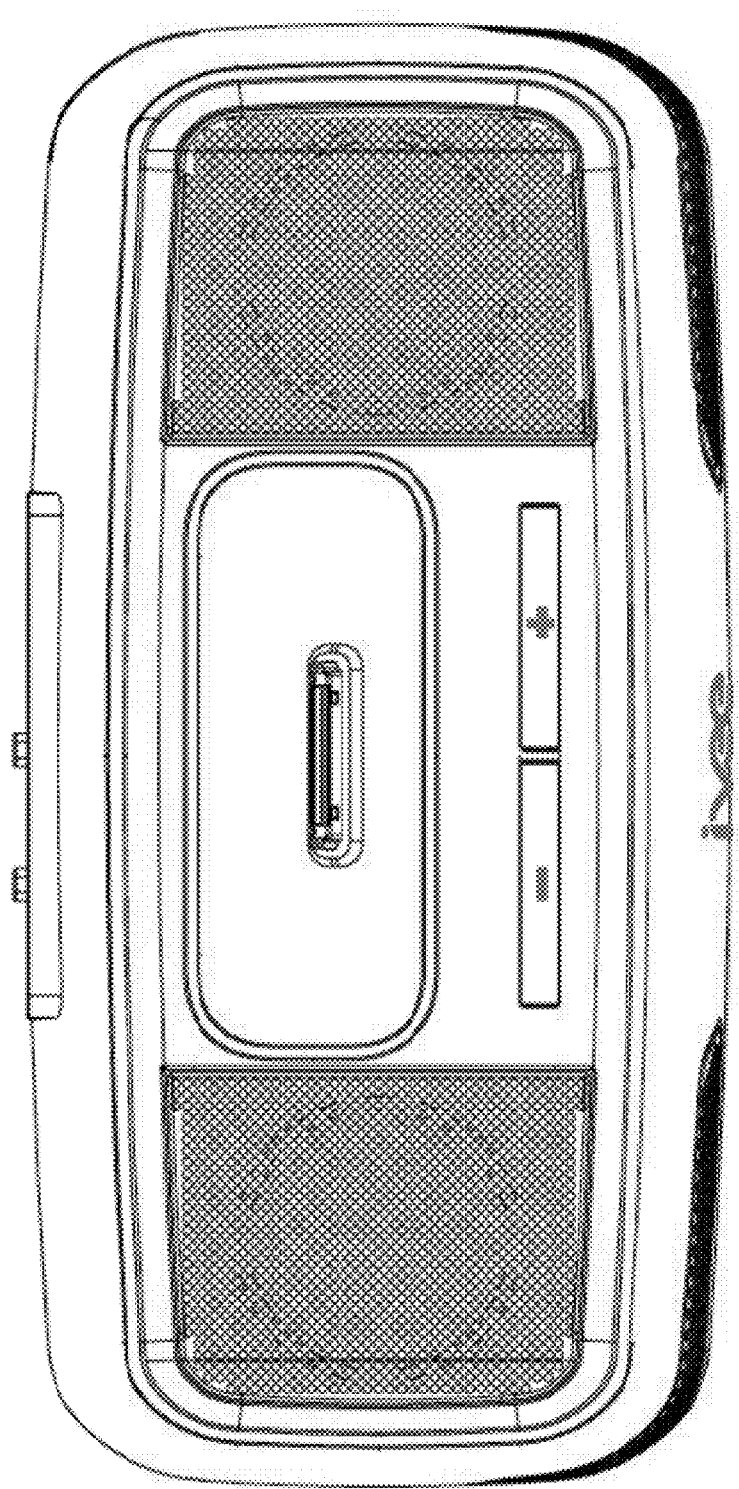

FIGS. 14A and 14B collectively provide views of an exemplary embodiment of an intelligent assistant device that functions as a base for receiving a second hardware device, such as a cellular telephone. It will be understood that the intelligent assistant device may include any communicative interface that allows for one or more devices to interface with the intelligent assistant device via a physical connection.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, and any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
continuously listening, via a microphone on an intelligent assistant device, for a first audio command, the first audio command being an audio initiating command;
upon receiving the audio initiating command and processing it on the intelligent assistant device, continuously listening, via the intelligent assistant device, for a second audio command;
transmitting the second audio command from the intelligent assistant device to a command processing server;
selecting, by the command processing server, at least one information source Application Programming Interface (API) from a plurality of APIs, for processing the second audio command, the second audio command having been converted from speech-to-text, wherein the selecting is based on at least one of: context, category, meaning, and keywords in the converted text of the second audio command;
transmitting, by the command processing server, the converted text of the second audio command to the selected at least one information source API for processing;
receiving at the command processing server, a response to the second audio command from the selected at least one information source API, the response provided via a notifications server;
transmitting the response from the command processing server to the intelligent assistant device; and
outputting the response via the intelligent assistant device.

2. The method according to claim 1, further comprising outputting at least one informational object in addition to the response via the intelligent assistant device.

3. The method according to claim 1, wherein the response is converted at the intelligent assistant device or at the command processing server from text to speech output when the response is text-based.

4. The method according to claim 1, further comprising pre-processing at least one of the first audio command and the second audio command using any of microphone array, beam-forming, noise-reduction, echo cancellation, and combinations thereof.

5. The method according to claim 1, further comprising transmitting the second audio command from the command processing server to a plurality of natural language processing engines to determine an intent of the converted text.

6. The method according to claim 1, further comprising storing any of the second audio command, the speech-to-text conversion of the second audio command, and the response in a data store.

7. The method according to claim 1, prior to transmitting the converted text of the second audio command to the selected at least one information source API:
formatting data from the converted text string of the second audio command to correspond to a data structure format of the selected at least one information source API.

8. The method of claim 1, wherein the command processing server is located in a cloud computing environment.

9. The method of claim 1, wherein the intelligent assistant device is a hardware device capable of being coupled to a second hardware device.

10. A device, comprising:
a first microphone and a second microphone;
a speaker; and
a processor that executes logic stored in memory to perform operations comprising:
continuously listening, via the first microphone and the second microphone, for a first audio command, the first audio command being an audio initiating command;
upon receiving the audio initiating command, continuously listening, via the first microphone and the second microphone, for a second audio command;
transmitting the second audio command from the device to a command processing server;
receiving a response to the second audio command from the command processing server, the response provided via a notifications server; and
outputting the response and one or more informational objects via any of a display screen or the speaker of the device.

11. The device according to claim 10, wherein the command processing server or the device cleans the second audio command via digital signal processing of the second audio command captured by both the first and second microphones.

12. The device according to claim 11, further comprising using beamforming to clean at least one of the first audio command and the second audio command using the second audio command captured by both the first and second microphones.

13. The device according to claim 10, wherein the response is converted from text to speech output on the device or at the command processing server, when the response is text-based.

14. A system, comprising:
an intelligent assistant device comprising a processor which executes logic to perform operations comprising:
continuously listening, via at least one microphone, for a first audio command, the first audio command being an audio initiating command; and
upon receiving the audio initiating command and processing it, continuously listening, via the at least one microphone, for a second audio command; and
a command processing server communicatively coupled with the intelligent assistant device, the command processing server comprising a processor that executes logic to perform operations comprising:
receiving the second audio command from the intelligent assistant device;
transmitting the second audio command to at least one information source Application Programming Interface (API) from a plurality of APIs, the second audio command having been converted from speech-to-text;
receiving at the command processing server, a response to the second audio command from the at least one information source API, the response being provided via a notifications server; and
transmitting the response and one or more informational objects from the command processing server to the intelligent assistant device.

15. The system according to claim 14, wherein the intelligent assistant device outputs the response via any of a display device or a speaker.

16. The system according to claim 14, wherein the response is converted from text to speech output when the response is text-based, via a processor of the intelligent assistant device or the command processing server.

17. The system according to claim 14, wherein a processor of the command processing server or a processor of the intelligent assistant device further executes logic to perform an operation of pre-processing at least one of the first audio command and the second audio command using any of microphone array, beam-forming, noise-reduction, echo cancellation, and combinations thereof.

18. The system according to claim 14, wherein a processor of the command processing server or a processor of the intelligent assistant device further executes logic to perform an operation of transmitting the second audio command to a natural language processing engine that converts the second audio command into speech-to-text.

19. The system according to claim 14, wherein the processor of the command processing server further executes the logic to perform an operation of storing any of the second audio command, the speech-to-text conversion of the second audio command, and the response in a data store.

20. The system according to claim 14, wherein the processor of the command processing server further executes the logic to perform operations of:
  prior to transmitting the second audio command to at least one information source API, evaluating a text conversion of the second audio command to determine any of context, category, meaning, and keywords included in the text conversion of the second audio command; and
  selecting the at least one information source API based upon the step of evaluating.

* * * * *